United States Patent [19]

Larsson

[11] 4,428,172
[45] Jan. 31, 1984

[54] FASTENING DEVICE FOR SCREEN OR WALL PANELS

[75] Inventor: Olof Larsson, Långsjövägen, Sweden

[73] Assignee: R. O. L. Inredningar AB, Stockholm, Sweden

[21] Appl. No.: 268,521

[22] Filed: May 29, 1981

[30] Foreign Application Priority Data

Jun. 5, 1980 [SE] Sweden ............................ 8004222

[51] Int. Cl.³ .............................................. E04B 2/82
[52] U.S. Cl. ................................... 52/489; 248/243; 403/187; 211/191
[58] Field of Search ............... 403/187; 52/474, 239, 52/489; 108/114; 248/243, 225.2; 182/179; 211/191

[56] References Cited

U.S. PATENT DOCUMENTS

| | | | |
|---|---|---|---|
| 1,826,419 | 10/1931 | Butkus | 248/243 |
| 1,962,396 | 6/1934 | Katz et al. | 248/243 |
| 2,261,956 | 11/1941 | Brownlie et al. | 108/114 |
| 2,930,665 | 3/1960 | Budai | 52/474 |
| 4,342,397 | 8/1982 | Halstrick | 403/187 |

Primary Examiner—James L. Ridgill, Jr.
Attorney, Agent, or Firm—Dowell & Dowell

[57] ABSTRACT

A fastening device (14) consisting of a plate bent to form what is essentially a U profile. The shanks (32) of this plate each comprise a narrow section (34), the end of which widens to form a pair of hooks (36, 38). The hooks are provided in order to allow attachment of the device to a vertical supporting rail (12) through the introduction of the shanks into corresponding parallel slots (20) in the rail, by which means a corresponding mounting device (26) on a screen or wall panel (10) can be hooked in between the rail (12) and the rib (30) of the fastening device itself. In order to prevent the fastening device from coming loose and falling out when a screen or wall panel is removed, at least one hook (36) of each shank (32) is provided with a projection (40) directed towards the rib of the fastening device. The smallest interval between the projection and the rib of the fastening device should be less than the sum of the thickness of the rib and the thickness of the material of which the supporting rail is made.

4 Claims, 4 Drawing Figures

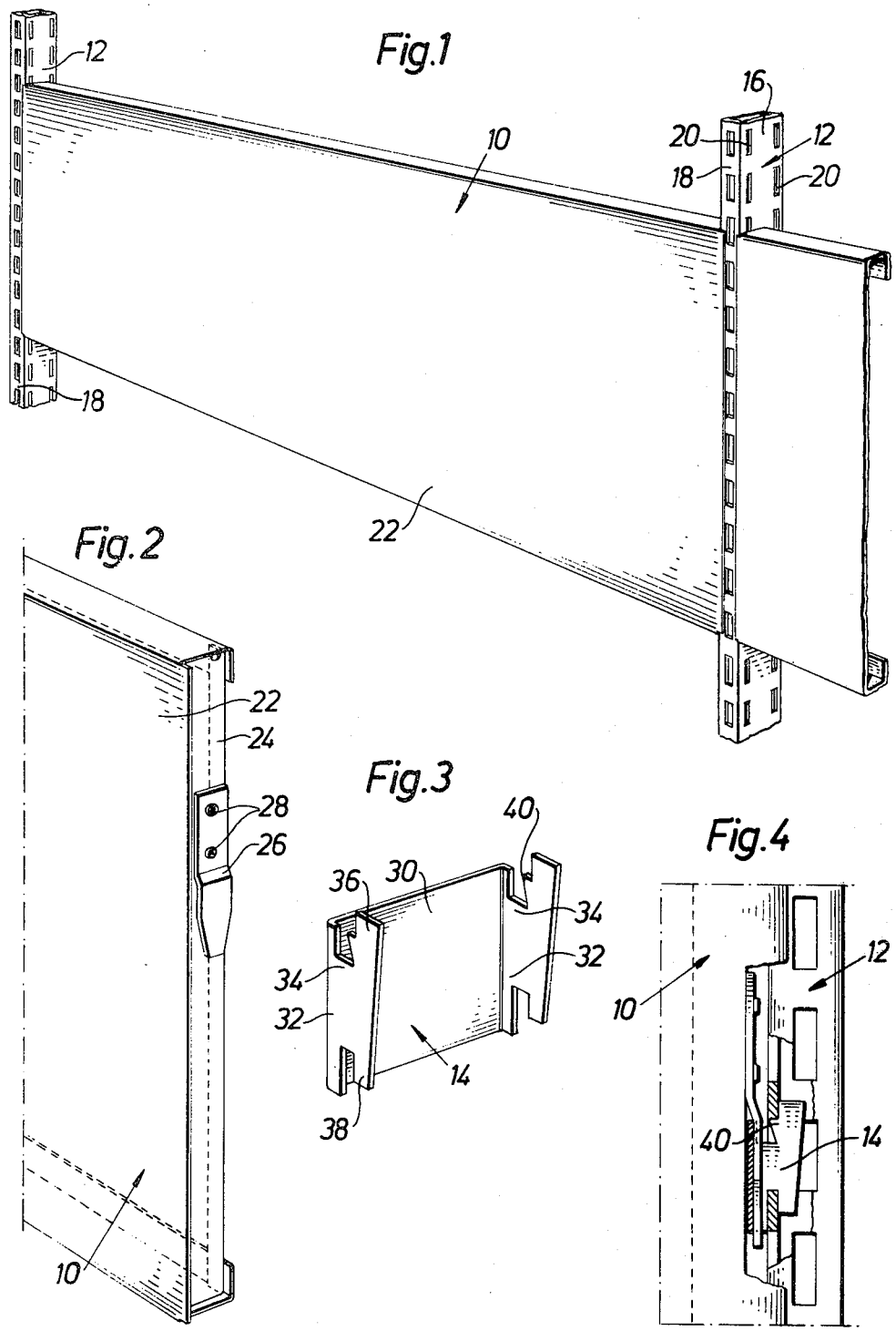

FASTENING DEVICE FOR SCREEN OR WALL PANELS

The present invention is concerned with a fastening device consisting of a plate bent to form what is essentially a U profile, each of the shanks of which comprises a narrow section provided with hooks projecting from the end to allow attachment of the device to a vertical supporting rail through the introduction of the shanks into corresponding parallel slots in the rail in such manner as to enable a corresponding mounting device on a screen or wall panel to be hooked in between the rail and the rib of the fastening device itself.

It is known practice to use devices of this type to build up screens and walls, partition walls in particular, between parallel, vertical supporting rails, which are also often used for erecting shelves and various types of stand. The mounting devices are provided along the edges of the screen or wall panel making up the partition wall. One fastening device at each end of the screen or wall panel is generally used, although in some cases two or more may be provided. The design of such devices should be such as to allow the wall to be erected simply and rapidly. In addition, it should be possible to take down the wall in a short time without the need for complicated tools.

In taking down screens and walls of the type under discussion, it has hitherto provided extremely difficult in designs of known type to remove individual screen or wall panels without at the same time causing the fastening devices to come loose from the supporting rails and fall out. This is because the fastening devices themselves are not sufficiently firmly attached to the rails, meaning that they, so to speak, follow along with the wall or screen panel being taken off its support. It has therefore been found desirable to design a fastening device that will not come loose from its rail whenever its particular wall or screen panel is to be removed. A device of this type would make assembly much simpler and also save time. Furthermore, in certain cases re-erection of screens or wall panels would be made easier, since the fastening devices used in previous structures would still be attached in the correct place.

This goal is achieved by the present invention through the provision of a fastening device of the type described in the introductory paragraph and chiefly characterized in that at least one hook of each shank comprises a projection directed towards the rib of the fastening device, and in particular in that the smallest interval between the projection and the rib of the fastening device must be less than the sum of the thickness of the rib and the thickness of the material of which the rail is made. A fastening device designed along these lines will remain securely attached to its supporting rail while its particular screen or wall panel is being removed. Once the screen or wall panel has been dismounted, the fastening device may either be removed or repositioned in other grooves at will.

The invention will now be described in greater detail in the form of a preferred embodiment thereof, reference being made to the attached drawing.

FIG. 1 shows a perspective view of two parallel, vertical supporting rails and a screen or wall panel attached to these.

FIG. 2 shows one end of a screen or wall panel with a mounting device for hooking the panel onto the rail.

FIG. 3 shows a perspective view of a fastening device designed according to the principles of the invention.

FIG. 4 shows a side view, partly in section, of the new fastening device and illustrates how it fits into place to allow attachment of a wall or screen panel to a supporting rail.

In FIG. 1 a wall or screen panel, denoted 10, is illustrated mounted between two vertical supporting rails 12 and held in position by fastening devices 14 of the type envisaged in the invention. In the present example, each supporting rail 12 has the form of a tube of rectangular section, the broader sides 16 of each rail being pierced with parallel rows of holes, while the narrower sides 18 are provided with a single row of holes. In the two parallel rows of holes, the long holes or slots 20 run parallel and occur in pairs at the same height along the rail.

A wall, usually a partition wall, is built up of a number of wall or screen panels 10 mounted above each other, each panel comprising a sheet or plate 22, formed as shown in greater detal in FIG. 2, and ajoining side members 24. Each of these side members 24 is provided with a separate mounting device 26 consisting of a plate screwed (at 28) into the side member 24 and so formed as to provide a suitable shape for hooking over the rib 30 of the fastening device 14 under discussion. It should be observed that the front of the wall or screen panel 10 projects slightly beyond the side members 24 such that after it has been hooked over the said fastening device 14 the panel will partly overlap the narrower sides 18 of the supporting rails 12. This helps to guide the panel 10 into place and keep it firmly in the required position.

The fastening device 14 illustrated in detail in FIGS. 3 and 4 consists of a single piece of plate bent into what is essentially a U shape. As is more particularly evident from FIG. 3, each shank 32 of the fastening device comprises a narrow section 34 which widens at the end to form hooks 36, 38 pointing in opposite directions. These hooks are to be introduced into a corresponding pair of grooves 20 such that once the wall or screen panel 10 has been mounted, parts of the hooks will come to bear against the inside of the supporting rail 12.

The upper hook 36 of each shank 32 is provided with a projection 40 directed towards the rib and widest at its upper end. The purpose of this projection 40 is, once the hooks 36, 38 of the fastening device 14 have been introduced into an appropriate pair of grooves 20, to project into the grooves and come to bear against their upper edges. By making the narrow section 34 and the projection 40 of the shank of a suitable size, the fastening device 14 will be firmly held in position once the mounting device 26 has been hooked into place between the rib 30 and its corresponding supporting rail 12.

Since the greatest load to which the fastening device 14 will be subjected will be on the upper hooks 36, these have been made somewhat more robust that the lower hooks 38.

Modifications to the fastening device 14 described above may be made within the terms of the invention. The projection 40 illustrated may clearly just as easily be provided on the lower hook 38 as on the upper; and a projection on both hooks is feasible as well. The supporting rails may also be of a design other than that shown in the illustration. They need therefore not be symmetrical but may instead comprise a single row of grooves along one narrow side only.

I claim:

1. Fastening device for mounting panel means to vertical support rails having inner and outer sufaces with openings therethrough which openings are defined by upper and lower walls comprising a generally U-shaped plate means having a central rib portion and a pair of generally parallel shank means which extend outwardly from opposite ends of said central rib portions, first and second hook means extending from the upper and lower portions of each of said shank means so as to be in spaced relationship to said central rib portion so that said hook means are selectively engaged through the opening in the support rails to the support rail, each of said first hook means having a projection along the length thereof which extends towards and is in spaced relationship to said central rib portion whereby the said fastening device is mounted to the vertical support rail with said projections engaging the upper walls defining an opening in the vertical support rail with said first and second hook means engaging inner surface thereof said central rib means will be disposed in fixed spaced relationship with the outer surface of the vertical support rail.

2. The fastening device of claim 1 in which said first hook means is larger than said second hook means.

3. Selectively assembled wall panel apparatus comprising at least one panel means having vertically extending edge portions, hook means mounted to each of said vertically edge portions of said panel means, vertical support rail means having inner and outer surfaces with openings therethrough which openings are defined by upper and lower walls, a generally U-shaped plate means having a central rib portion and a pair of generally parallel shank means which extend outwardly from opposite ends of said central rib portion, first and second hook means extending from the upper and lower portions of each of said shank means so as to be in spaced relationship to said central rib portion so that said hook means are selectively engaged through said openings to said support rails, each of said first hook means having a projection along the length thereof which extends towards and in spaced relationship to said central rib portion, said hook means mounted to said vertical edge portions of said panel means being selectively engageable between said central rib portion and said outer surface of said vertical support rails, and said projections being engageable with the upper walls defining said openings in said vertical support ribs.

4. The invention of claim 3 in which said projections are spaced from said central rib portion by a distance which is at least equal to the sum of the thickness of the rib and the distance between the inner and outer surfaces of said vertical support rails.

* * * * *